United States Patent
Pang (10) Patent No.: US 6,846,256 B2
(45) Date of Patent: Jan. 25, 2005

(54) BOTTLE-ROTATING DEVICE FOR AN INDUCTION CAP SEALER

(75) Inventor: Hua-Chang Pang, Taichung Hsien (TW)

(73) Assignee: KSP Technologies Corp., Taichung Hsien (TW)

( * ) Notice: Subject to any disclaimer, the term of this patent is extended or adjusted under 35 U.S.C. 154(b) by 169 days.

(21) Appl. No.: 10/243,454

(22) Filed: Sep. 13, 2002

(65) Prior Publication Data

US 2004/0053718 A1 Mar. 18, 2004

(51) Int. Cl.$^7$ ................................................ F16H 7/00
(52) U.S. Cl. ....................................... 474/136; 53/285
(58) Field of Search ............................... 474/136, 148; 53/334, 329.5, 285, 329.2; 198/415

(56) References Cited

U.S. PATENT DOCUMENTS

| | | | |
|---|---|---|---|
| 776,170 A | * 11/1904 | Burkhardt | 474/136 |
| 3,557,933 A | * 1/1971 | Sopher | 198/394 |
| 3,928,115 A | * 12/1975 | Kerwin | 156/363 |
| 4,464,884 A | * 8/1984 | Franks | 53/557 |
| 5,023,755 A | * 6/1991 | Rosenberg | 362/12 |
| 5,701,990 A | * 12/1997 | Novak et al. | 198/604 |

* cited by examiner

Primary Examiner—Thomas R. Hannon
Assistant Examiner—Vicky A. Johnson
(74) Attorney, Agent, or Firm—Alan D. Kamrath; Nikolai & Mersereau, P.A.

(57) ABSTRACT

A bottle-rotating device has a rotation device and an auxiliary pressing device. The rotation device corresponds to an induction coil in an induction cap sealer. The rotation device has a bottom plate, a top plate, a belt, a drive train and a driver. The belt and the drive train are mounted between the bottom plate and the top plate, and the drive train has a straight section corresponding to the induction coil. The belt is mounted around the drive train and is driven by the driver. The auxiliary pressing device corresponds to the rotation device. The auxiliary pressing device has a pressing strip securely held on pressing strip holders parallel to the straight section of the drive train. Accordingly, the bottles will be rotated and the foil on the bottle cap be heated evenly.

16 Claims, 7 Drawing Sheets

BOTTLE-ROTATING DEVICE FOR AN INDUCTION CAP SEALER

BACKGROUND OF THE INVENTION

1. Field of the Invention

The present invention relates to a bottle-rotating device, and more particularly to a bottle-rotating device for an induction cap sealer, which can rotate the bottle to heat a foil evenly.

2. Description of Related Art

To keep food fresh between the time the food is bottled and sold, a foil or ring is always mounted on the rim of the bottle to seal the opening of the bottle. To seal the foil on the bottle, an induction cap sealer is always used. A conventional induction cap sealer comprises a body, a conveyer and an induction coil. The conveyer is moveably mounted on the top of the body to transport the bottles. The induction coil is mounted on the body above the conveyer. When the bottles pass the induction coil, the induction coil heats the foil to slightly melt the foil to bond the foil to the rim around the opening in the bottle to seal the opening closed.

However, because the conveyer on the conventional induction cap sealer transports the bottles along a straight line and the bottles do not rotate when being heated, the induction coil cannot evenly heat the whole periphery of the foil. A gap easily occurs between the foil and the opening in the bottle when the foil is not heated and melted evenly.

To overcome the shortcomings, the present invention provides a bottle-rotating device to mitigate or obviate the aforementioned problems.

SUMMARY OF THE INVENTION

The main objective of the invention is to provide a bottle-rotating device for an induction cap sealer that can rotate the bottles to heat a foil evenly. The bottle-rotating device has a rotation device and an auxiliary pressing device. The rotation device corresponds to the induction coil of the induction cap sealer. The rotation device has a bottom plate, a top plate, a belt, a drive train and a driver. The top plate is mounted above the bottom plate. The belt and the, drive train are mounted between the bottom plate and the top plate, and the drive train has a straight section corresponding to the induction coil. The belt is a closed loop and is moved by the driver around the drive train. The auxiliary pressing device corresponds to the rotation device. The auxiliary pressing device has at least two pressing strip holders and a pressing strip. The pressing strip is securely mounted on the pressing strip holders and is parallel to the straight section of the drive train. Accordingly, the bottles will be rotated by the bottle-rotating device when the bottles pass through the induction coil. Consequently, the foil on the bottle can be heated evenly, and gaps between the foil and the opening in the bottle are prevented.

Other objectives, advantages and novel features of the invention will become more apparent from the following detailed description when taken in conjunction with the accompanying drawings.

DETAILED DESCRIPTION OF PREFERRED EMBODIMENT

Figure 1:
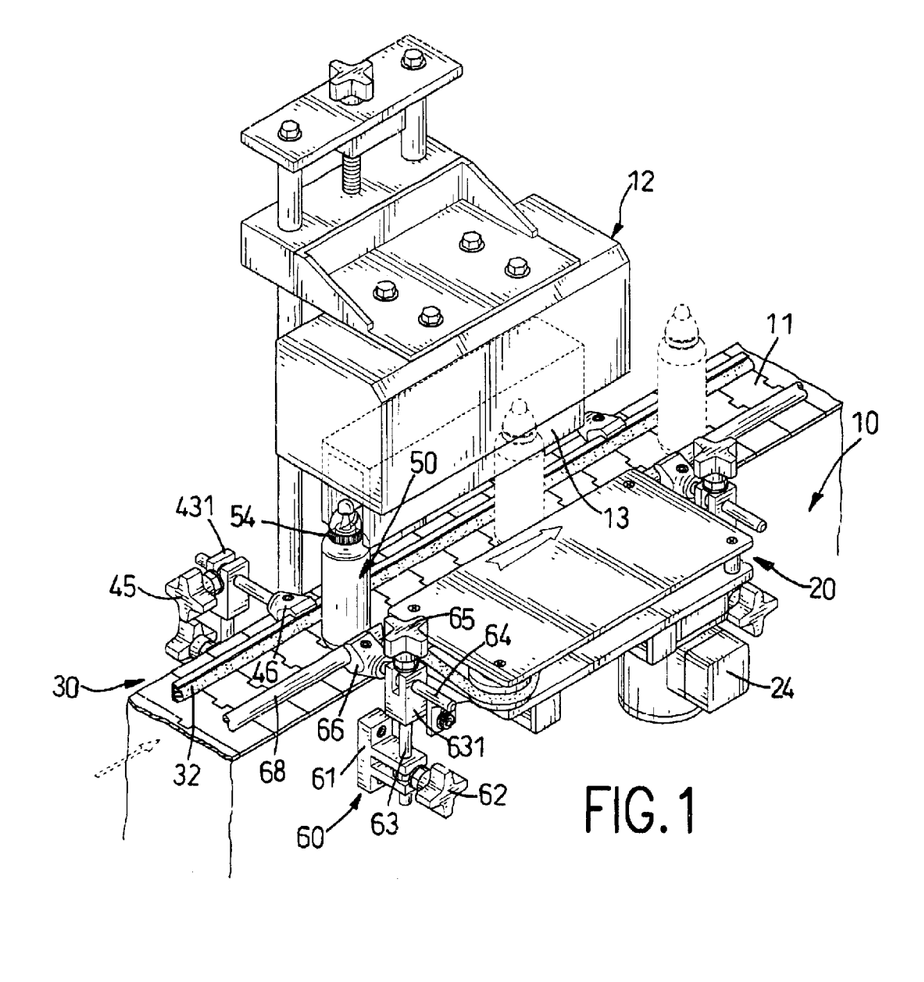
FIG. 1 is a perspective view of an induction cap sealer with a bottle-rotating device in accordance with the present invention.
Figure 2:
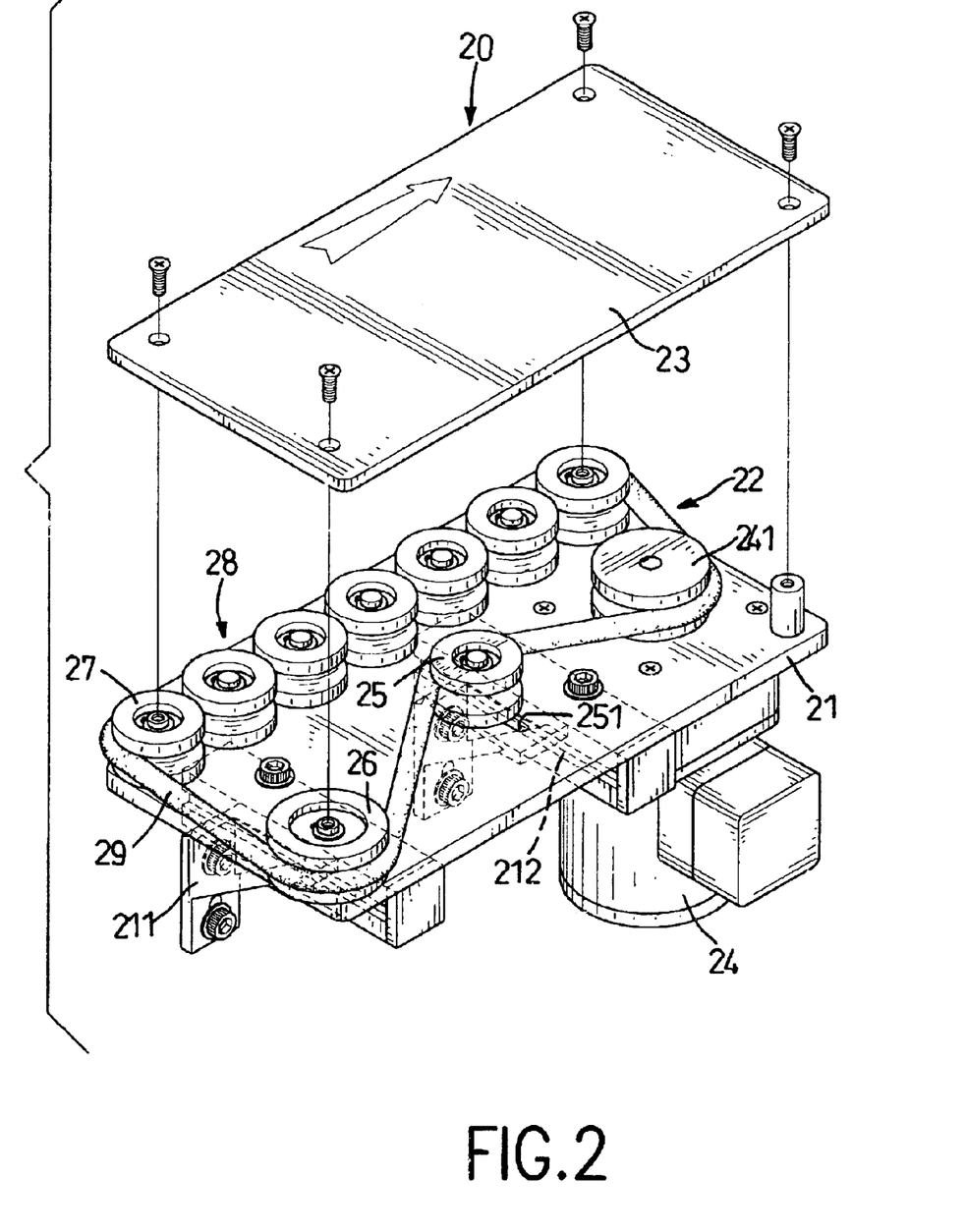
FIG. 2 is an exploded perspective view of the rotation device of the bottle-rotating device in FIG. 1.
Figure 3:
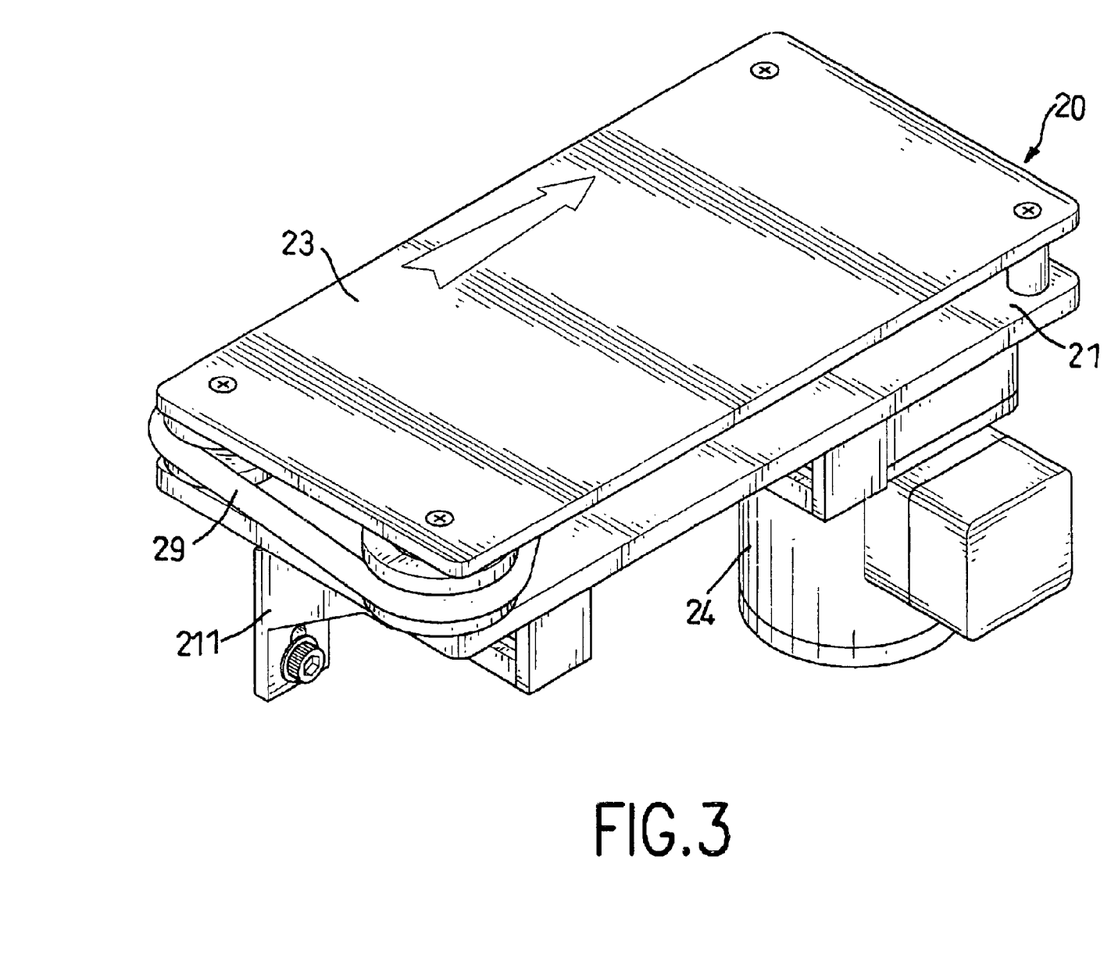
FIG. 3 is a perspective view of the rotation device of the bottle-rotating device in FIG. 1.

With reference to FIGS. 1 to 3, the bottle-rotating device in accordance with the present invention for an induction cap sealer comprises a rotation device (20) and an auxiliary pressing device (30). The induction cap sealer comprises a body (10), an induction coil (12), a conveyor (11), a heating element (13) and the bottle-rotating device. The body (10) has a top, a front, a back and two ends. The induction coil (12) is mounted above the top of the body (10). The rotation device (20) is securely attached to the front of the body (10) in a position corresponding to the induction coil (12).

The rotation device (20) has two ends, a bottom plate (21), two upside-down L-shaped brackets (211), a top plate (23), a belt (29), a drive train (22), a driver (24) and two guide rod assemblies. The bottom plate (21) has a bottom and a top and is attached to the front of the body (10) with the two upside-down L-shaped brackets (211). In practice, tracks (212) are attached to the bottom of the bottom plate (21). Each track (212) is moveably attached to the corresponding bracket (211) with a fastener (not shown). When the fastener is released, the track (212) can be moved relative to the bracket (211) so the position of the bottom plate (21) can be adjusted.

The top plate (23) has a top and a bottom and corresponds to the bottom plate (21). The drive train (22) is mounted between the bottom plate (21) and the top plate (23) and has a straight section (28) corresponding to the induction coil (12). The drive train (22) comprises a drive wheel (241), a load wheel (26), a belt tensioning wheel (25) and multiple guide rollers (27). The belt (29) is a closed loop, has an inside and an outside and is operationally mounted around the drive wheel (241), the load wheel (26) and the guide rollers (27) with the belt tensioning wheel (25) pressing against the outside of the belt (29). The belt (29) and the drive train (22) are mounted between the bottom plate (21) and the top plate (23). The drive wheel (241) is rotated by the driver (24) and causes the belt (29) to move around the drive train (22). In practice, the driver (24) is a motor with a shaft and is attached to the bottom of the bottom plate (21). The drive wheel (241) is securely attached to the shaft of the motor to rotate with the shaft of the motor. The load wheel (26) is rotatably attached to the bottom plate (21) and the top plate (23). The guide rollers (27) are rotatably mounted on the bottom plate (21) in a line facing the auxiliary pressing device (30). The guide rollers (27) form the straight section (28) of the drive train (22).

A slot (251) is defined in the bottom plate (21) between the drive wheel (241) and the load wheel (26) perpendicular to the straight section (28) of the drive train (22). The belt tensioning wheel (25) is mounted on an axle that extends through and is detachably mounted in the slot (251). The tension of the belt (29) is adjusted by moving the belt tensioning wheel (25) along the slot (251) and securing it in position in the slot (251).

Figure 4:
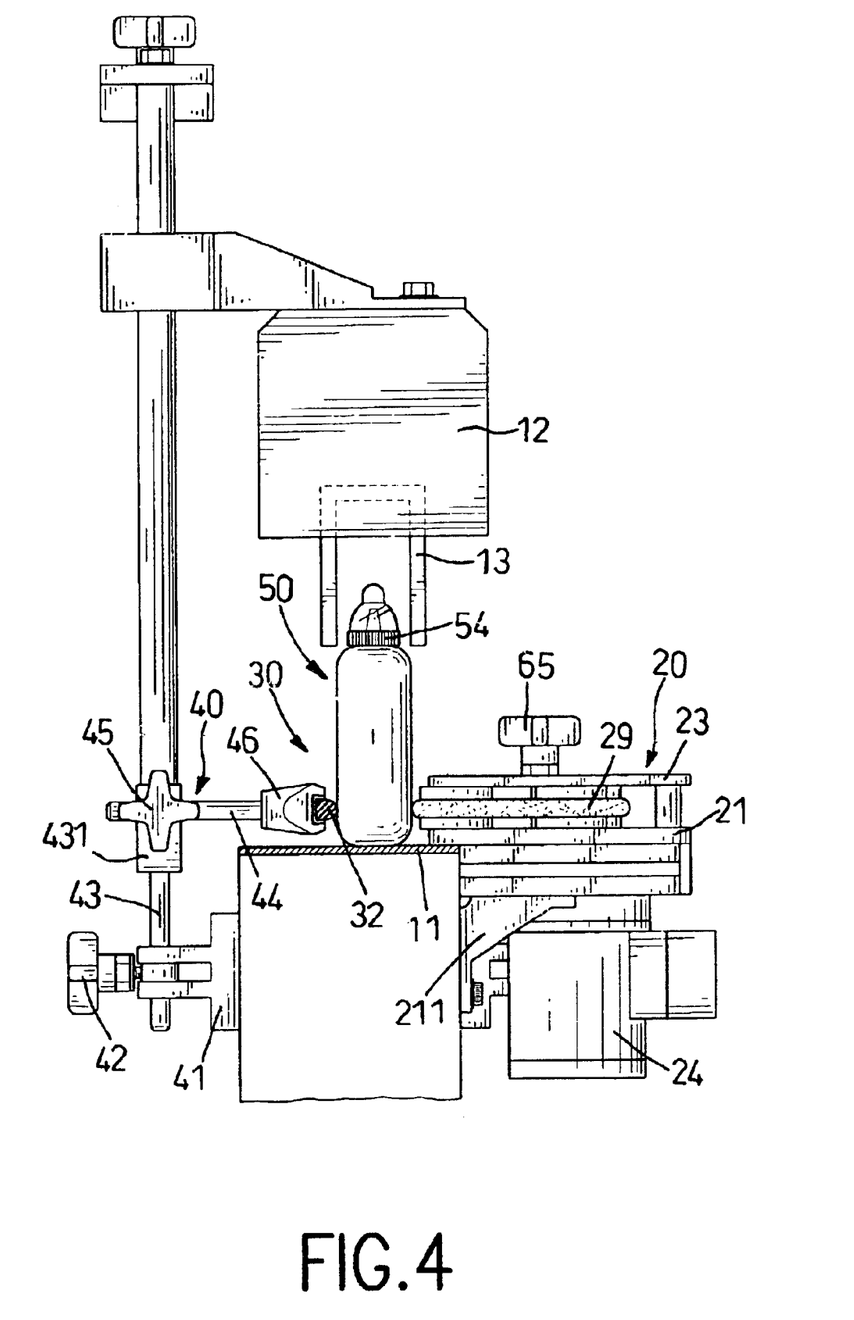
FIG. 4 is a side plan view of the induction coil with the bottle-rotating device in FIG. 1.
Figure 5:
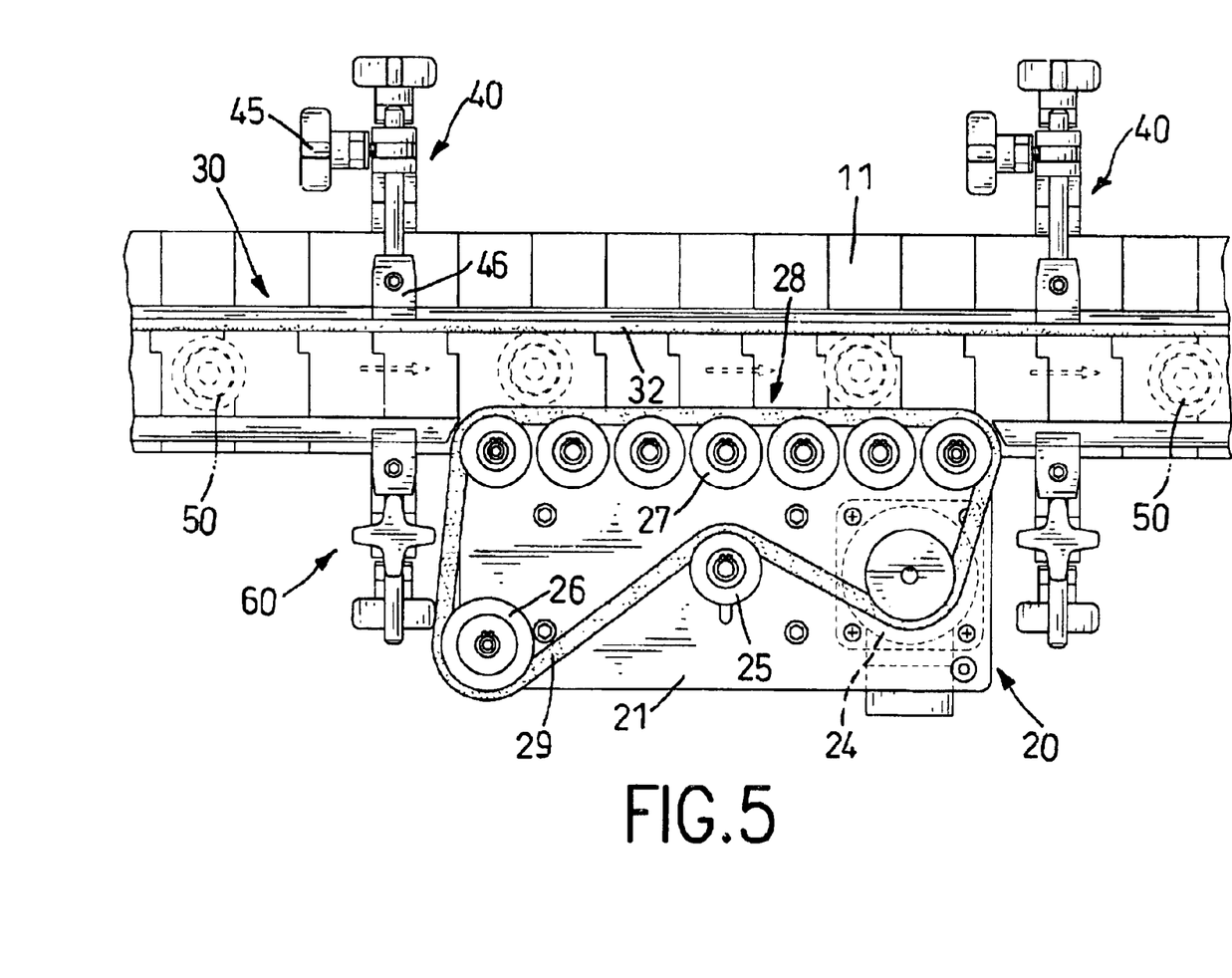
FIG. 5 is an operational top plan view of the bottle-rotating device in FIG. 1.

With further reference to FIGS. 4 and 5, the auxiliary pressing device (30) is mounted on the back of the body (10) opposite from and corresponding to the rotation device (20). The auxiliary pressing device (30) has a pressing strip (32) and two pressing strip holders (40). The pressing strip (32) is securely held by the pressing strip holders (40) and is parallel to the straight section (28) of the drive train (22). The pressing strip holders (40) are attached to the body (10). Each holder (40) has a lower bracket (41), a vertical rod (43), an upper bracket (431), a horizontal rod (44) and a clamp (46). The lower bracket (41) is attached to the back of the body (10). The vertical rod (43) has an upper end (not numbered) and a lower end (not numbered) and is adjustably attached to the lower bracket (41) so the height of the upper end can be adjusted. The upper bracket (431) is attached to the upper end of the vertical rod (43), and the horizontal rod (44) is adjustably mounted in the upper bracket (431). The horizontal rod (44) has a front end (not numbered) and a rear end (not numbered). The clamp (46) is attached to the front end of the horizontal rod (44) to securely clamp onto and hold the pressing strip (32) in place. In practice, the vertical rod (43) is moveably mounted through the lower bracket (41). A lower adjusting screw (42) has two ends with one end being a free end and a knob mounted on the other end. The lower adjusting screw (42) is screwed into the lower bracket (41), and the free end presses against and holds the vertical rod (43) in place. When the lower adjusting screw (42) is loosened, the height of the vertical rod (43) can be changed to adjust the height of the pressing strip (32). The horizontal rod (44) is moveably mounted through the upper bracket (431). An upper adjusting screw (45) has two ends with one end being a free end and a knob mounted on the other end. The upper adjusting screw is screwed into the upper bracket (431), and the free end presses against and holds the horizontal rod (44) in place. When the adjusting screw (45) is loosened, the lateral position of the pressing strip (32) can be changed to adjust the distance between the pressing strip (32) and the belt (29) to accommodate different size bottles (50).

With reference to FIGS. 1 and 5, each guide rod assembly is comprised of a guide rod (68) and a guide rod bolder (60). The two guide rod holders (60) are mounted on the front of the body (10) of the induction cap sealer and are respectively located at two ends of the rotation device (20). A guide rod (68) is securely clamped on each guide rod holder (60) and is parallel to the pressing strip (32) and aligned with the straight section (28) of the drive train (22). In practice, the structure of the guide rod holder (60) is the same as that of the pressing strip holder (40). Each guide rod holder (60) has a lower bracket (61), a vertical rod (63), an upper bracket (631), a horizontal rod (64) and a clamp (66). The lower bracket (61) is attached to the front of the body (10) of the induction cap sealer. The vertical rod (63) is adjustably mounted on the lower bracket (61). A lower adjusting screw (62) has two ends with one end being a free end and a knob mounted on the other end. The lower adjusting screw (62) is screwed into the lower bracket (61), and the free end presses against and holds the vertical rod (63) in place. When the lower adjusting screw (62) is loosened, the height of the vertical rod (63) can be changed to adjust the height of the guide rod (68). The upper bracket (631) is mounted on the vertical rod (63), and the horizontal rod (64) adjustably mounted on the upper bracket (631). An upper adjusting screw (65) has two ends with one end being a free end and a knob mounted on the other end. The upper adjusting screw (65) is screwed into the upper bracket (631), and the free end presses against and holds the horizontal rod (64) in place. When the adjusting screw (65) is loosened, the lateral position of the guide rod (68) can be changed. The clamp (66) is mounted on the horizontal rod (64) to securely hold the corresponding guide rod (68) in place.

Figure 6:
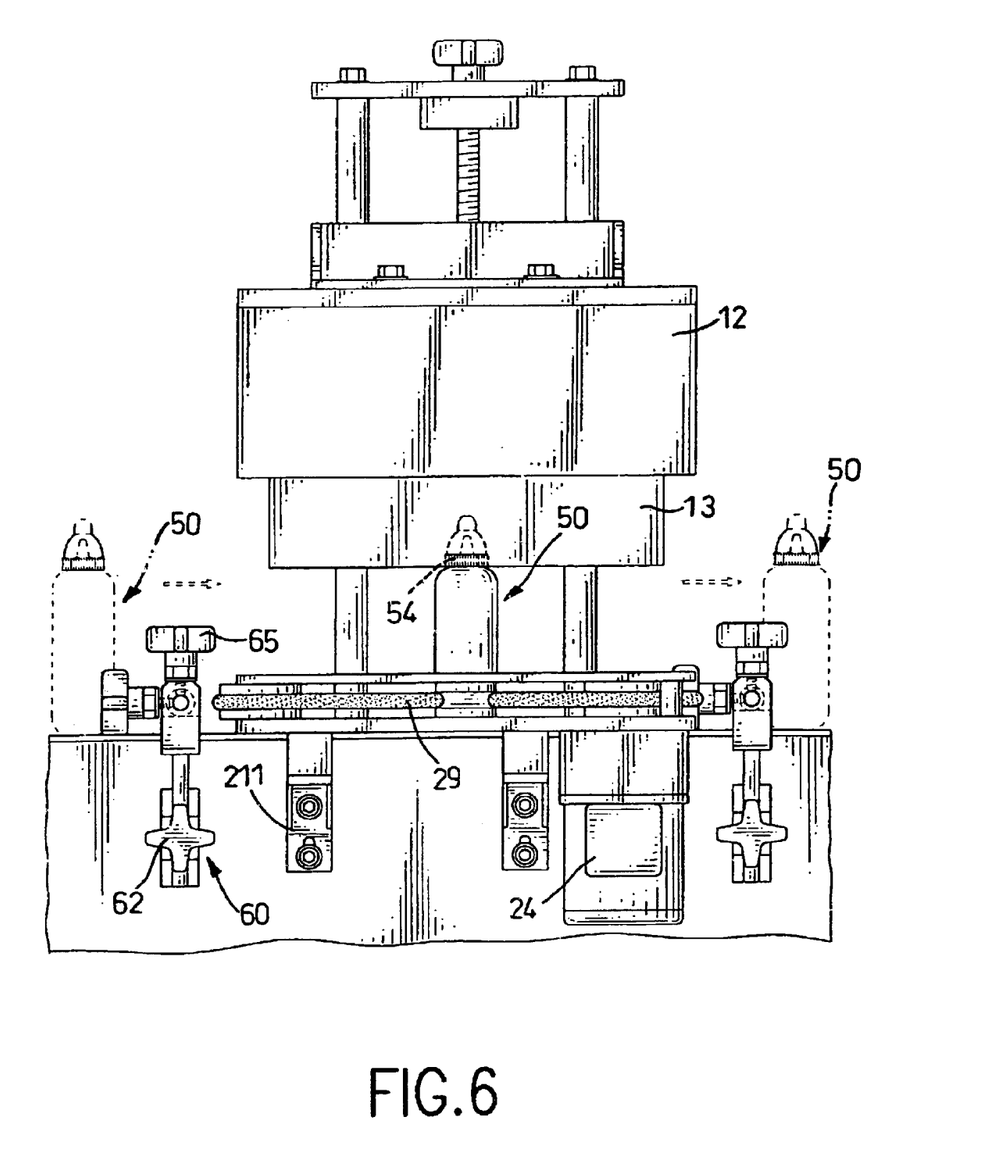
FIG. 6 is an operational front plan view of the induction cap sealer with the bottle-rotating device in FIG. 1.

With reference to FIGS. 4 to 6, when the conveyer (11) of the induction cap sealer transports a bottle (50) to the induction coil (12), the bottle (50) will be squeezed between the belt (29) and the pressing strip (32). The guide rods (68) serve to position the bottles (50) properly on the conveyor (11) when the bottles (50) enter or leave the induction coil (12). The moving belt (29) will cause the bottles (50) to rotate between straight section (28) of the rotation device (20) and the pressing strip (32). Consequently, foils (54) on the bottles (50) will be evenly heated by the heat generated by the heating element (13) of the induction cap sealer. Gaps between the foil (54) and the opening of the bottle (50) will be prevented. Food in the bottle (50) can be preserved in a good condition for a desired term.

Figure 7:
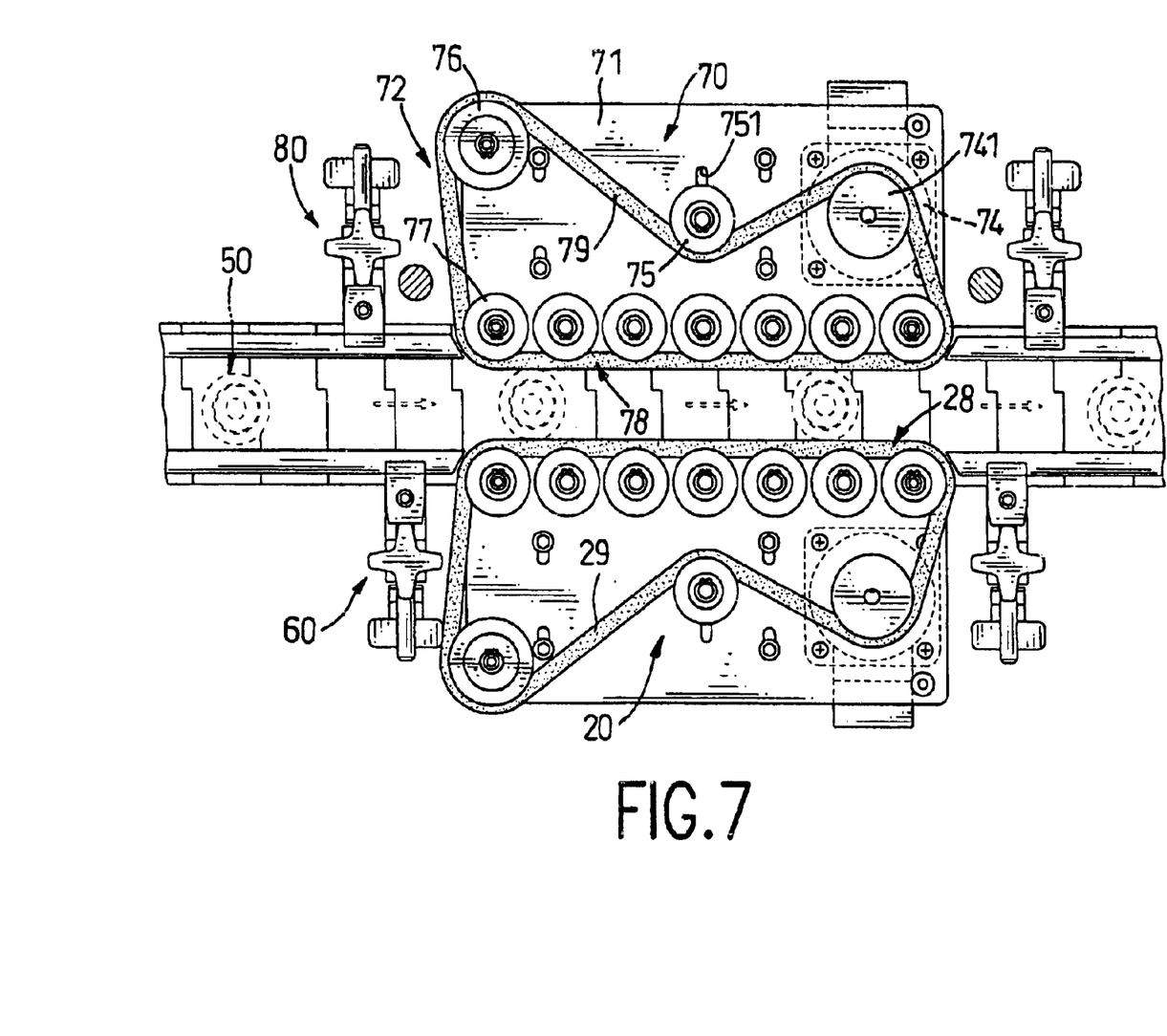
FIG. 7 is a top plan view in partial cross section of the bottle-rotating device with a second embodiment of an auxiliary pressing device in accordance with the present invention.

In a second embodiment, with reference to FIG. 7, the auxiliary pressing device (70) has a structure similar to that of the rotation device (20). The auxiliary pressing device has a bottom plate (71), a top plate (not shown), an auxiliary belt (79), an auxiliary drive train (72), a driver (74) and two guide rod assemblies (80). The bottom plate (71) has a bottom and a top and is attached to the rear of the body (10) with the two upside-down L-shaped brackets (not shown). The top plate has a top and a bottom and corresponds to the bottom plate (71). The auxiliary drive train (72) is mounted between the bottom plate (71) and the top plate and has a straight section (78) corresponding and parallel to the straight section (28) of the rotation device (20). The auxiliary drive train (72) comprises a drive wheel (741), a load wheel (76), a belt tensioning wheel (75) and multiple guide rollers (77). The auxiliary belt (79) is a closed loop, has an inside and an outside and is operationally mounted around the drive wheel (741), the load wheel (76) and the guide rollers (77) with the belt tensioning wheel (75) pressing against the outside of the auxiliary belt (79). The auxiliary belt (79) and the auxiliary drive train (72) are mounted between the bottom plate (71) and the top plate. The drive, wheel (741) is rotated by the driver (74) and causes the auxiliary belt (79) to move around the drive train (72) in a rotating direction opposite to that of the belt (29) of the rotation device (20). In practice, the driver (74) is a motor with a shaft and is attached to the bottom of the bottom plate (71). The drive wheel (741) is securely attached to the shaft of the motor to rotate with the shaft of the motor. The load wheel (76) is rotatably attached to the bottom plate (71) and the top plate. The guide rollers (77) are rotatably mounted on the bottom plate (71) in a line facing the straight section of drive train (22) of the rotation device (20). The guide rollers (77) form the straight section (78) of the auxiliary drive train (72).

A slot (751) is defined in the bottom plate (71) between the drive wheel (741) and the load wheel (76) perpendicular to the straight section (78) of the auxiliary drive train (72). The belt tensioning wheel (75) is mounted on an axle that extends through and is detachably mounted in the slot (751). The tension of the auxiliary belt (79) is adjusted by moving the belt tensioning wheel (75) along the slot (751) and securing it in position in the slot (751).

Each guide rod holder (80) of the auxiliary pressing device (70) has a structure same to that of the guide rod holder (60) and is not further discussed.

With opposite rotating directions of the belts (29,79) of the rotation device (20) and the auxiliary pressing device (70), the bottles will be actuated to rotate so that the foils on the bottles will be evenly heated.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bottle-rotating device for an induction cap sealer comprising:
   a rotation device adapted to be securely attached to a body of the induction cap sealer and adapted to correspond to an induction coil of the induction can sealer, the rotation device having:
      a belt formed in a loop;
      a drive train driven by a driver to move the belt around the drive train and having a straight section adapted to correspond to the induction coil;
      a bottom plate with a bottom adapted to be attached to the body; and
      a top plate separately mounted above the bottom plate, wherein the belt is mounted between the bottom plate and the top plate, and the drive train is mounted between the bottom plate and the top plate; and
   an auxiliary pressing device adapted to be mounted on the body of the induction cap sealer and corresponding and parallel to the straight section of the drive train of the rotation device so as to be adapted to rotate a bottle on the induction cap sealer in cooperation with the rotation device, wherein the driver is a motor with a shaft, with the motor attached to the bottom of the bottom plate with the shaft extending through the bottom plate; and
   the drive train comprises:
   a drive wheel rotatably mounted between the bottom plate and the top plate and securely attached to the shaft of the motor,
   a load wheel rotatably mounted between the bottom plate and the top plate; and multiple guide rollers rotatably mounted between the bottom plate and the top plate at a side facing the pressing strip and arranged in a line, wherein the belt is mounted around the drive wheel, the load wheel and the guide rollers, with the load wheel and two of the multiple guide rollers being rotatably attached to both the top plate and the bottom plate.

2. The bottle-rotating device as claimed in claim 1, wherein the drive train further comprises a belt tensioning wheel rotatably mounted between the bottom plate and the top plate, with the belt tensioning wheel being moveably mounted on the bottom plate and pressing against the belt at a position between the drive wheel and the load wheel.

3. The bottle-rotating device as claimed in claim 2, wherein the bottom plate has a slot defined in the bottom plate perpendicular to the straight section of the drive train between the drive wheel and the load wheel through which an axle on which the belt tensioning wheel is mounted extends.

4. The bottle-rotating device as claimed in claim 1 further comprising two upside-down L-shaped brackets each including first and second portions arranged at right angles, with the first portion mounted on the bottom of the bottom plate and the second portion adopted to be securely attached to the body of the induction cap sealer.

5. The bottle-rotating device as claimed in claim 4 further comprising a track securely attached to the bottom of the bottom plate and slideably mounted on the first portion of each respective bracket with a fastener.

6. The bottle-rotating device as claimed in claim 1, wherein the auxiliary pressing device has:
   at least two pressing strip holders adapted to be secured to the body of the induction cap sealer; and
   a pressing strip securely held on the at least two pressing strip holders and parallel to the straight section of the drive train, wherein each at least two pressing strip holders comprises:
   a lower bracket adapted to be attached to the body of the induction cap sealer;
   a vertical rod adjustably mounted on the lower bracket;
   an upper bracket mounted on the vertical rod;
   a horizontal rod adjustably slideably mounted on the upper bracket, with the horizontal rod being slideable perpendicular to the vertical rod and perpendicular to the straight section of the drive train; and
   a clamp mounted on the horizontal rod to securely hold the pressing strip in place.

7. The bottle-rotating device as claimed in claim 6, wherein the vertical rod is moveably mounted through the lower bracket; and an adjusting screw is screwed into the lower bracket and has a free end pressing against the vertical rod to selectively hold the vertical rod in place.

8. The bottle-rotating device as claimed in claim 6, wherein the horizontal rod is slideably mounted through the upper bracket; and an adjusting screw is screwed into the upper bracket and has a free end pressing against the horizontal rod to selectively hold the horizontal rod in place.

9. The bottle-rotating device as claimed in claim 6, further comprising a guide rod assembly adapted to be mounted on the body of the induction cap sealer comprising:
   a guide rod holder mounted at each respective end of the rotation device; and
   a guide rod securely clamped on each respective guide rod holder parallel to the pressing strip and aligned with the straight section of the drive train of the rotating device, wherein each guide rod holder comprises:
   a lower bracket adapted to be mounted on the body of the induction cap sealer;
   a vertical rod slideably adjustably mounted on the lower bracket;
   an upper bracket mounted on the vertical rod;
   a horizontal rod slideably adjustably mounted on the upper bracket, with the horizontal rod being slideable perpendicular to the vertical rod and perpendicular to the straight section of the drive train; and
   a clamp mounted on the horizontal rod to securely hold the corresponding one of the guide rods in place.

10. The bottle-rotating device as claimed in claim 9, wherein the vertical rod is slideably mounted through the lower bracket; and an adjusting screw is screwed into the lower bracket and has a free end pressing against the vertical rod to selectively hold the vertical rod in place.

11. The bottle-rotating device as claimed in claim 9, wherein the horizontal rod is slideably mounted through the upper bracket; and an adjusting screw is screwed into the upper bracket and has a free end pressing against the horizontal rod to selectively hold the horizontal rod in place.

12. The bottle-rotating device as claimed in claim 1, wherein the auxiliary pressing device has:
   an auxiliary belt formed in a loop; and an auxiliary drive train driven by an auxiliary driver to move the auxiliary belt around the auxiliary drive train in a rotating direction opposite to that of the belt in the rotation device, and having a straight section parallel to the straight section of the drive train of the rotation device.

13. The bottle-rotating device as claimed in claim 12, wherein the auxiliary pressing device further comprises:

a bottom plate with a bottom adapted to be attached to the body, and a top plate separately mounted above the bottom plate, wherein the auxiliary belt is mounted between the bottom plate and the top plate; and the auxiliary drive train is mounted between the bottom plate and the top plate.

14. The bottle-rotating device as claimed in claim 13 wherein the auxiliary driver is a motor with a shaft, with the motor attached to the bottom of the bottom plate with the shaft extending through the bottom plate; and the auxiliary drive train comprises:

a drive wheel rotatably mounted between the bottom plate and the top plate and securely attached to the shaft of the motor;

a load wheel rotatably mounted between the bottom plate and the top plate; and multiple guide rollers rotatably mounted between the bottom plate and the top plate at a side facing the straight section of the rotation device and arranged in a line, wherein the auxiliary belt is mounted around the drive wheel, the load wheel and the guide rollers, with the load wheel and two of the multiple guide rollers being rotatably attached to both the top plate and the bottom plate.

15. The bottle-rotating device as claimed in claim 14, wherein the auxiliary drive train further comprises a belt tensioning wheel rotatably mounted between the bottom plate and the top plate, with the belt tensioning wheel being moveably mounted on the bottom plate and pressing against the auxiliary belt at a position between the drive wheel and load wheel.

16. The bottle-rotating device as claimed in claim 15, wherein the bottom plate has a slot defined in the bottom plate perpendicular to the straight section of the auxiliary drive train between the drive wheel and the load wheel through which an axle on which the belt tensioning wheel is mounted extends.

* * * * *